US012671837B2

(12) United States Patent
Taquet et al.

(10) Patent No.: US 12,671,837 B2
(45) Date of Patent: Jun. 30, 2026

(54) METHOD AND APPARATUS OF ENCODING/DECODING POINT CLOUD CAPTURED BY A SPINNING SENSORS HEAD

(71) Applicant: BEIJING XIAOMI MOBILE SOFTWARE CO., LTD., Beijing (CN)

(72) Inventors: Jonathan Taquet, Beijing (CN); Sebastien Lasserre, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 276 days.

(21) Appl. No.: 18/576,080

(22) PCT Filed: Apr. 23, 2022

(86) PCT No.: PCT/CN2022/088640
§ 371 (c)(1),
(2) Date: Jan. 2, 2024

(87) PCT Pub. No.: WO2023/273551
PCT Pub. Date: Jan. 5, 2023

(65) Prior Publication Data
US 2024/0333972 A1 Oct. 3, 2024

(30) Foreign Application Priority Data

Jul. 2, 2021 (EP) ..................................... 21305920

(51) Int. Cl.
*H04N 19/597* (2014.01)
*G06T 9/00* (2006.01)
*H04N 19/59* (2014.01)

(52) U.S. Cl.
CPC ........... *H04N 19/597* (2014.11); *H04N 19/59* (2014.11)

(58) Field of Classification Search
USPC ......................................... 382/232–233, 243
See application file for complete search history.

(56) References Cited

U.S. PATENT DOCUMENTS 11,528,477 B2 * 12/2022 Paluri .................. H04N 19/124
12,002,244 B2 * 6/2024 Ramasubramonian ......................
H04N 19/70
(Continued)

OTHER PUBLICATIONS

Fan, Y. et al. Pixels and panoramas: an enhanced cubic mapping scheme for video/image-based virtual-reality scenes; IEEE Consumer Electronics Magazine Mar. 2019; pp. 44-49.
(Continued)

*Primary Examiner* — Ishrat I Sherali
(74) *Attorney, Agent, or Firm* — Cozen O'Connor

(57) ABSTRACT

Methods and apparatus of encoding/decoding a point cloud into a bitstream of encoded point cloud data captured by a spinning sensors head. Each point of the point cloud is associated with spherical coordinates and attributes. The methods comprises signaling, in the bitstream, a scaling offset information representing scaling offsets, and for each current point of the point cloud: encoding/decoding the spherical coordinates of the current point; obtaining decoded spherical coordinates of the current point from the encoded spherical coordinates; scaling the decoded spherical coordinates of the current point by using the scaling offsets; and encoding/decoding at least one attribute of the current point based on the scaled decoded spherical coordinates.

20 Claims, 6 Drawing Sheets

(56) References Cited

U.S. PATENT DOCUMENTS

| | | | | |
|---|---|---|---|---|
| 12,236,649 | B2 * | 2/2025 | Zhang | G06F 7/50 |
| 12,256,096 | B2 * | 3/2025 | Pham Van | G06T 9/001 |
| 12,432,382 | B2 * | 9/2025 | Ohkawa | H04N 19/463 |
| 12,475,603 | B2 * | 11/2025 | Champel | H03M 7/70 |
| 2020/0013235 | A1 | 1/2020 | Tsai et al. | |
| 2020/0045288 | A1 | 2/2020 | Boyce | |
| 2021/0327097 | A1 * | 10/2021 | Ramasubramonian | H04N 19/90 |
| 2023/0007303 | A1 * | 1/2023 | Iguchi | H04N 19/18 |
| 2023/0421814 | A1 * | 12/2023 | Ohkawa | H04N 19/60 |
| 2024/0029311 | A1 * | 1/2024 | Park | H04N 19/597 |
| 2024/0029317 | A1 * | 1/2024 | Ramasubramonian | G06T 9/001 |

OTHER PUBLICATIONS

Indian Patent Application No. 202447007318, Search and Opinion dated Jun. 4, 2025, 8 pages.
International Patent Application No. PCT/CN2022/088640 International Search Report and Written Opinion dated Jul. 22, 2022, 8 pages.
WG 7, MPEG 3D Graphics Coding, "G-PCC codec description", ISO/IEC JTC 1/SC 29/WG 7, N 0057, Jan. 2021, 142 pages.
LG Electronics Inc. "[G-PCC] [EE13.43] Report on coordinate conversion" ISO/IEC JTC1/SC29/WG11 MPEG2020/m54622, Jun. 2020, 6 pages.
Korean Patent Application No. 10-2024-7003371, Office Action dated Jan. 31, 2025, with English translation, 13 pages.

* cited by examiner

METHOD AND APPARATUS OF ENCODING/DECODING POINT CLOUD CAPTURED BY A SPINNING SENSORS HEAD

CROSS-REFERENCE TO RELATED APPLICATION

This application is a U.S. national phase application of International Application No. PCT/CN2022/088640, filed on Apr. 23, 2022, which claims priority to and benefits of European Patent Application No. 21305920.7, filed Jul. 2, 2021, the entire content of which is incorporated herein by reference.

FIELD

The present application generally relates to point cloud compression and, in particular to methods and apparatus of encoding/decoding locations and attributes of points of a point cloud captured by a spinning sensors head.

BACKGROUND

The present disclosure is intended to introduce the reader to various aspects of art, which may be related to various aspects of at least one exemplary embodiments of the present application that is described and/or claimed below. This disclosure is helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

SUMMARY

The following section presents a simplified summary of at least one exemplary embodiment to provide a basic understanding of some aspects of the present application. This summary is not an extensive overview of an exemplary embodiment. It is not intended to identify key or critical elements of an embodiment. The following summary merely presents some aspects of at least one of the exemplary embodiments in a simplified form as a prelude to the more detailed description provided elsewhere in the document.

According to a first aspect of the present application, there is provided a method of encoding a point cloud into a bitstream of encoded point cloud data captured by a spinning sensors head, each point of the point cloud being associated with spherical coordinates and at least one attribute, said spherical coordinates representing an azimuthal angle representing a capture angle of the sensor of the spinning sensors head that captured the point, an elevation angle relative to an elevation of the sensor that captured the point and a radius depending on a distance of the point from a referential, the method comprising:

signaling, in the bitstream, a scaling offset information representing scaling offsets; for each current point of the point cloud:
  encoding the spherical coordinates of the current point and adding encoded spherical coordinates of the current point to the bitstream;
  obtaining decoded spherical coordinates by decoding the encoded spherical coordinates of the current point;
  scaling the decoded spherical coordinates based on the scaling offsets; and
  encoding at least one attribute of the current point based on the scaled decoded spherical coordinates and adding at least one encoded attribute to the bitstream.

According to a second aspect of the present application, there is provided a method of decoding a point cloud from a bitstream of encoded point cloud data captured by a spinning sensors head, wherein the method comprises:
  accessing a scaling offset information from the bitstream;
  for each current point of the point cloud:
    obtaining decoded spherical coordinates by decoding encoded spherical coordinates of the current point obtained from the bitstream, the spherical coordinates of the current point representing an azimuthal angle representing a capture angle of the sensor of a spinning sensors head that captured the current point, an elevation angle relative to an elevation of the sensor that captured the current point and a radius depending on a distance of the current point from a referential;
    scaling the decoded spherical coordinates based on scaling offsets obtained from the scaling offset information; and
    decoding attributes of the current point based on the scaled decoded spherical coordinates.

According to a third aspect of the present application, there is provided an apparatus of encoding a point cloud into a bitstream of encoded point cloud data captured by a spinning sensors head. The apparatus comprising one or more processors configured to carry out a method according to the first aspect of the present application.

According to a fourth aspect of the present application, there is provided an apparatus of decoding, from a bitstream, a point of a point cloud captured by a spinning sensors head. The apparatus comprising one or more processors configured to carry out a method according to the second aspect of the present application.

According to a fifth aspect of the present application, there is provided a non-transitory storage medium carrying instructions of program code for executing a method according to the first aspect of the present application.

According to a sixth aspect of the present application, there is provided a non-transitory storage medium carrying instructions of program code for executing a method according to the second aspect of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DETAILED DESCRIPTION

Figures 1, 2:
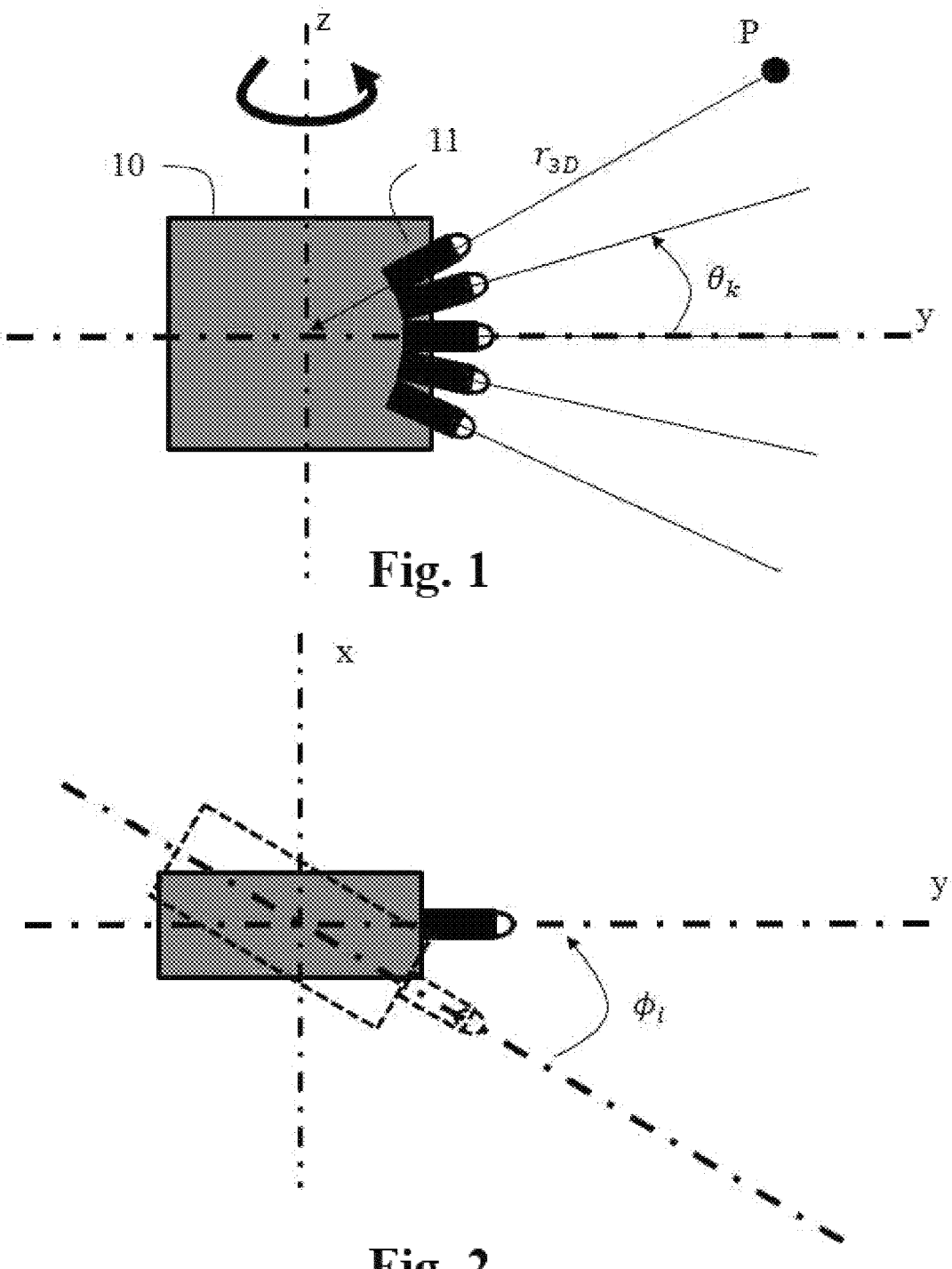
FIG. 1 illustrates a side view of a sensors head and some of its parameters in accordance with prior art.
FIG. 2 illustrates a top view of the sensors head and some of its parameters in accordance with prior art.

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x,y and z) and at least one attribute.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely > MPEG-I part 5 (ISO/IEC 23090-5) or Video-based Point Cloud Compression (V-PCC)
> MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de) coding is performed after complete geometry (de) coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data captured by a spinning sensors head, e.g. a spinning Lidar head, mounted on a moving vehicle. This usually requires a simple and low-latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to sparse geometry data captured by a spinning sensors head have been already exploited to get very efficient encoding/decoding methods.

For example, G-PCC exploits the elevation angle (relative to the horizontal ground) of capture from a spinning sensors head as depicted on FIGS. 1 and 2. A spinning sensors head 10 comprises a set of sensors 11 (for example lasers), here five sensors are represented. The spinning sensors head 10 may spin around a vertical axis z to capture geometry data of a physical object, i.e. the 3D locations of points of the point cloud. The geometry data captured by the spinning sensors head is then represented in spherical coordinates $(r_{3D}, \phi, \theta)$, where $r_{3D}$ is the distance of a point P from the spinning sensors head's center, $\phi$ is an azimuthal angle of the sensor head's spin relative to a referential, and $\theta$ is an elevation angle for an elevation angle index k of a sensor of the spinning sensors head relative to a horizontal referential plane (here the y axis). The elevation angle index k may be relative, for instance, to an elevation angle of a sensor k, or a k-th sensor position, in case a single sensor is successively probing for the each one of the successive elevation angles.

Figure 3:
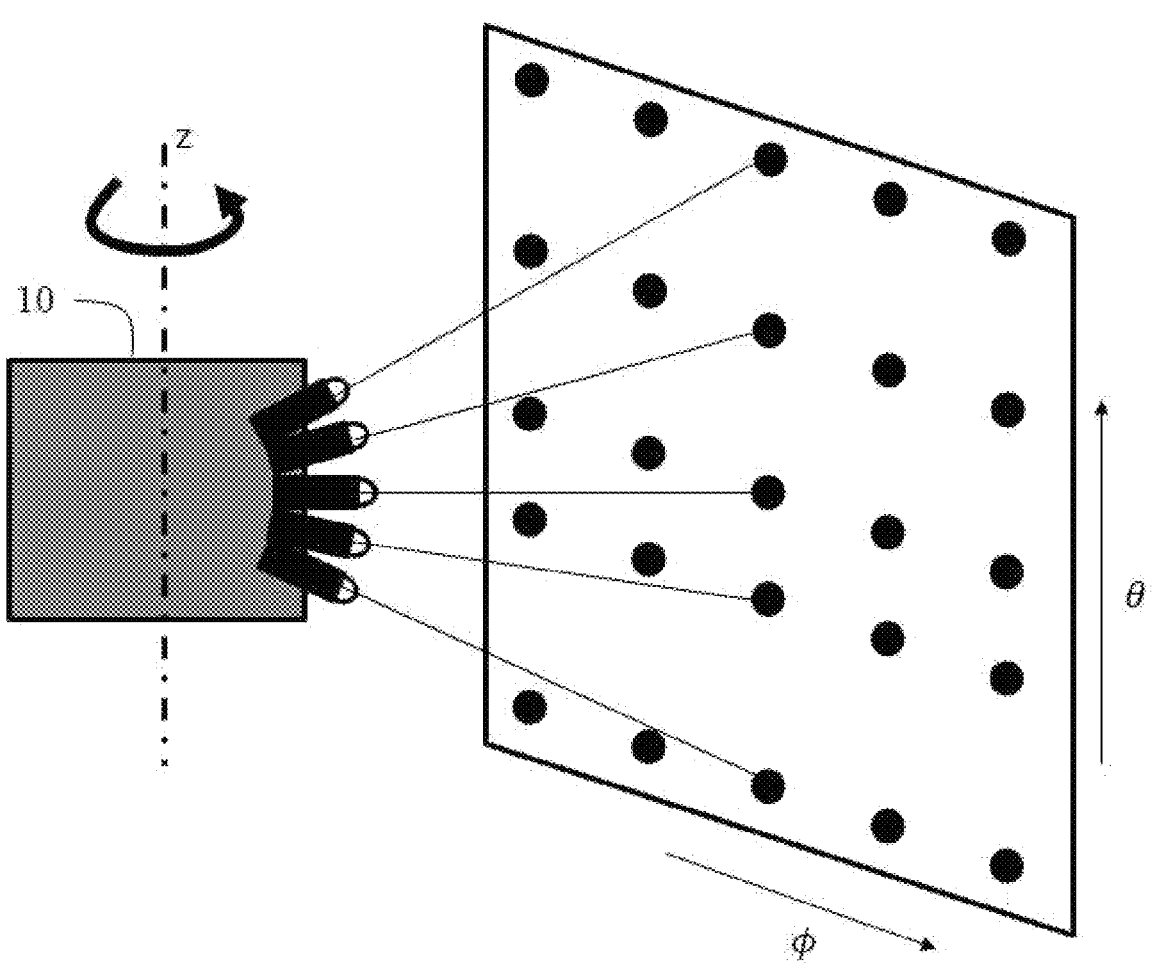
FIG. 3 illustrates a regular distribution of data captured by a spinning sensors head in accordance with prior art.

A regular distribution along the azimuthal angle has been observed on geometry data captured by a spinning sensors head as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i \forall i=0$ to I−1 where I is a number of azimuthal angles used for the capture of the points and $\theta_k$ $\forall k=0$ to K−1 where K is a number of sensors of the spinning sensors head 10. Basically, G-PCC represents sparse geometry data captured by a spinning sensors head on a 2D discrete angular plane $(\phi, \theta)$ as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into coordinates $(\phi, \theta)$ and from the location of these coordinates relative to discrete coordinates $(\phi_i, \theta_k)$ obtained from already coded points.

Figure 4:
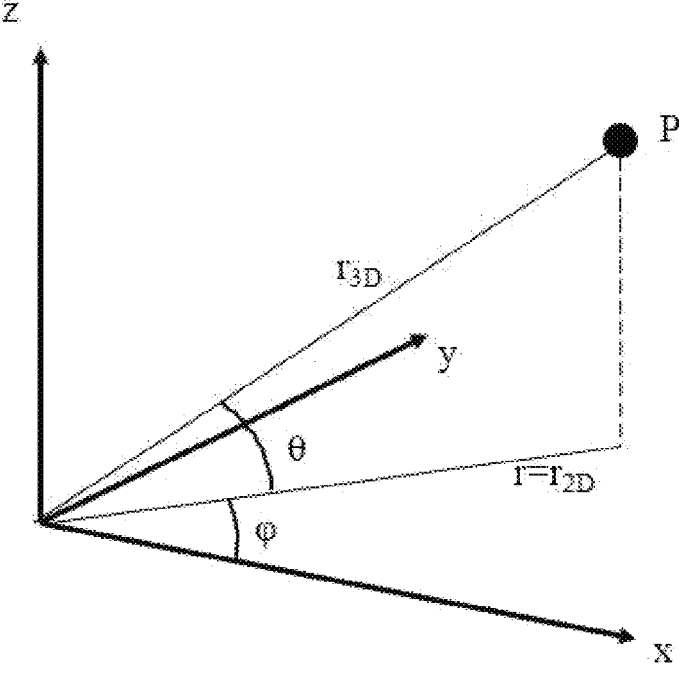
FIG. 4 illustrates a representation of a point in a 3D space in accordance with prior art.

The predictive tree directly codes a first version of location of a current point P in the spherical coordinates $(r, \phi, \theta)$, where r is the projected radius on the horizontal xy plane as depicted on FIG. 4 by $r_{2D}$, using the quasi 1D nature $(r, \phi_i, \theta_k)$ of this coordinate space. Then, spherical coordinates $(r, \phi, \theta)$ are converted into 3D cartesian coordinates (x,y,z) and a xyz residual is coded to tackle the errors of coordinate conversion, the approximation of elevation and azimuthal angles and potential noise.

Figures 5, 6:
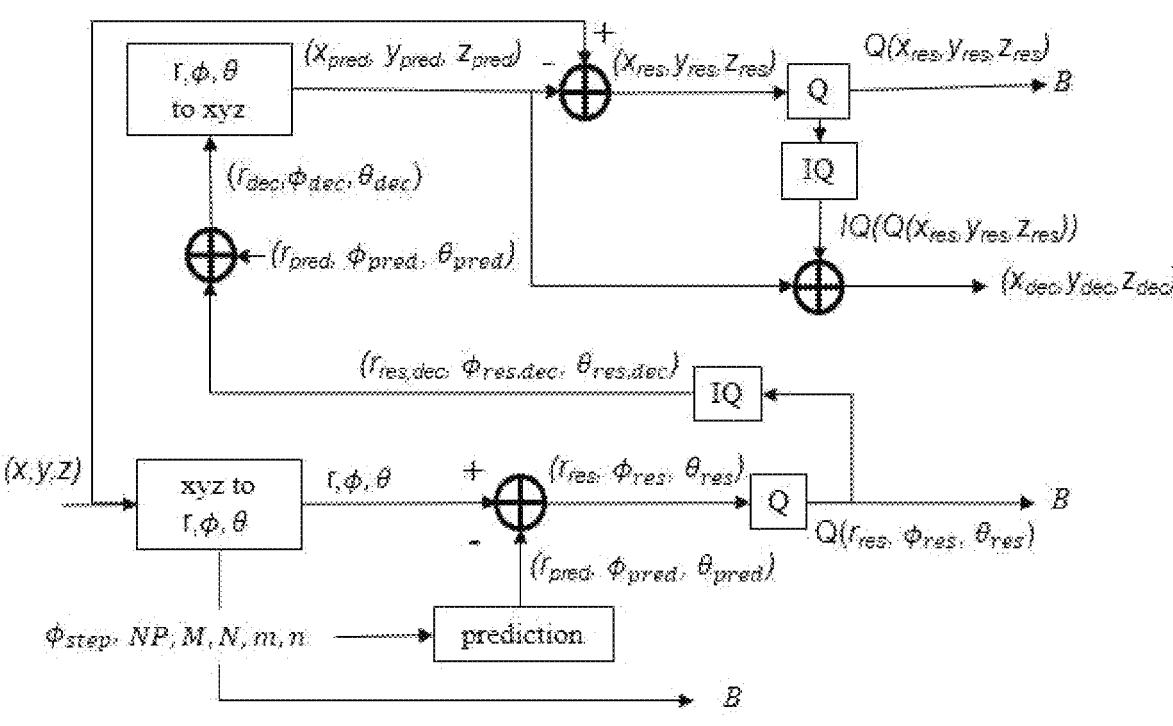
FIG. 5 illustrates a point cloud encoder that is similar to G-PCC predictive tree-based encoder in accordance with prior art.
FIG. 6 illustrates a point cloud decoder that is similar to G-PCC predictive tree-based decoder in accordance with prior art.

FIG. 5 illustrates a point cloud encoder that is similar to G-PCC predictive tree-based encoder.

First, cartesian coordinates (x,y,z) of points of the point cloud are transformed into spherical coordinates $(r, \phi, \theta)$ by $(r, \phi, \theta)=C2A (x,y,z)$.

The transformation function C2A (.) is partly given by:

$$r = \text{round}\left(sqrt(x*x + y*y)/\Delta Ir\right)$$

$$\phi = \text{round}\left(atan2(y, x)/\Delta I\phi\right)$$

where round ( ) is the rounding operation to the nearest integer value, sqrt ( ) is the square root function and a tan 2(y,x) is the arc tangent applied to y/x.

$\Delta Ir$ and $\Delta I\phi$ are internal precisions for radiuses and azimuthal angles respectively. They are typically the same as their respective quantization steps, i.e. $\Delta I\phi=\Delta\phi$, and $\Delta Ir=\Delta r$ with $$\Delta\phi = \frac{2\pi}{2^N} \tag{1}$$

and, $$\Delta r = 2^M * \text{elementary quantization step}$$

where M and N are two parameters of the encoder that may be signaled in a bitstream, for example in a geometry parameter set, and where elementary quantization step is typically equal to 1. Typically, N may be 17, and M may be 0 for lossless coding.

The encoder may derive $\Delta\phi$ and $\Delta r$ by minimizing the cost (e.g. the number of bits) for coding the spherical coordinates representation and the xyz residual in cartesian space.

For sake of simplicity, $\Delta\phi = \Delta I\phi$ and $\Delta r = \Delta I r$ hereafter.

Also for sake of clarity and simplicity, $\theta$ is used hereafter as an elevation angle value, that is obtained, for instance using $$\theta = a\tan\left(\frac{Z}{r}\right),$$

where a $\tan(.)$ is an arc tangent function. But, in G-PCC for instance $\theta$ is an integer value representing the elevation angle index k of $\theta_k$ (i.e., the index of the k-th elevation angle), and so operations presented hereafter (prediction, residual (de) coding, etc. . . . ) performed on $\theta$ would be applied on the elevation angle index instead. Someone skilled in point cloud compression would easily understand the advantage of using index k, and how to use elevation angle index k instead of $\theta$. Also, someone skilled in point cloud compression would easily understand that this subtility does not affect the principle of the proposed invention.

Residual spherical coordinates $(r_{res}, \phi_{res}, \theta_{res})$ between spherical coordinates $(r, \phi, \theta)$ and predicted spherical coordinates obtained from a predictor $PR_n$ are then given by:

$$(r_{res}, \phi_{res}, \theta_{res}) =$$
$$(r, \phi, \theta) - (r_{pred}, \phi_{pred}, \theta_{pred}) = (r, \phi, \theta) - (r_n, \phi_n, \theta_n) - (0, m * \phi_{step}, 0)$$

where $(r_n, \phi_n, \theta_n)$ are a predicted radius, predicted azimuthal angle and predicted elevation angle obtained from a predictor selected from a list of candidate predictors $PR_0$, $PR_1$, $PR_2$ and $PR_3$ and m is an integer number of elementary azimuthal steps $\phi_{step}$ to be added to a prediction of the azimuthal angle.

The elementary azimuthal step $\phi_{step}$ may be derived by the encoder from the frequencies and rotation speed at which a spinning sensors head is performing capture at the different elevation angles, for example from NP the number of probing per head turn:

$$\phi_{step} = \frac{2 * \pi}{NP * \Delta I \phi} \quad (2)$$

The elementary azimuthal step $\phi_{step}$ or the number of probing per head turn NP is encoded in a bitstream B in a geometry parameter set for example. Alternatively, NP is a parameter of the encoder that may be signaled in a bitstream in a geometry parameter set, and $\phi_{step}$ is similarly derived in both encoder and decoder.

The residual spherical coordinates $(r_{res}, \phi_{res}, \theta_{res})$ may be encoded in a bitstream B.

The residual spherical coordinates $(r_{res}, \phi_{res}, \theta_{res})$ may be quantized (Q) in quantized residual spherical coordinates $Q(r_{res}, \phi_{res}, \theta_{res})$. Quantized residual spherical coordinates $Q(r_{res}, \phi_{res}, \theta_{res})$ may be encoded in a bitstream B.

The prediction index n and the number m are signaled in the bitstream B for each node of the predictive tree, while the elementary azimuthal step $\phi_{step}$ with some fixed-point precision is shared by all nodes of a same predictive tree.

The prediction index n points to a selected predictor among a list of candidate predictors.

A candidate predictor $PR_0$ may equal to $(r_{min}, \phi_0, \theta_0)$, where $r_{min}$ is the minimum radius value (provided in the geometry parameter set), and $\phi_0$ and $\theta_0$ are equal to 0 if a current node (current point P) has no parent or are equal to azimuthal and elevation angles of the point associated with the parent node.

Another candidate predictor $PR_1$ may equal to $(r_0, \phi_0, \theta_0)$, where $r_0$, $\phi_0$ and $\theta_0$ are respectively the radius, azimuthal and elevation angle of the point associated with the parent node of a current node.

Another candidate predictor $PR_2$ may equal to a linear prediction of the radius, azimuthal and elevation angles using the radius, azimuthal and elevation angles $(r_0, \phi_0, \theta_0)$, of the point associated with the parent node of a current node, and the radius, azimuthal and elevation angle $(r_1, \phi_1, \theta_1)$ of the point associated with the grand-parent node.

For example, $PR_2 = 2*(r_0, \phi_0, \theta_0) - (r_1, \phi_1, \theta_1)$

Another candidate predictor $PR_3$ may equal to a linear prediction of the radius, azimuthal and elevation angles using the radius, azimuthal and elevation angles $(r_0, \phi_0, \theta_0)$ of the point associated with the parent node of a current node, the radius, azimuthal and elevation angles $(r_1, \phi_1, \theta_1)$ of the point associated with the grand-parent node and the radius and the azimuthal and elevation angles $(r_2, \phi_2, \theta_2)$ of the point associated with the great grand-parent.

For example, $PR_3 = (r_0, \phi_0, \theta_0) + (r_1, \phi_1, \theta_1) - (r_2, \phi_2, \theta_2)$ Predicted cartesian coordinates $(x_{pred}, y_{pred}, z_{pred})$ are obtained by inverse transforming decoded spherical coordinates $(r_{dec}, \phi_{dec}, \theta_{dec})$ by:

$$(x_{pred}, y_{pred}, z_{pred}) = A2C(r_{dec}, \phi_{dec}, \theta_{dec}) \quad (3)$$

where decoded spherical coordinates $(r_{dec}, \phi_{dec}, \theta_{dec})$, as by a decoder, may be given by:

$$(r_{dec}, \phi_{dec}, \theta_{dec}) = (r_{res,dec}, \phi_{res,dec}, \theta_{res,dec}) + (r_{pred}, \phi_{pred}, \theta_{pred}) = \quad (4)$$
$$(r_{res,dec}, \phi_{res,dec}, \theta_{res,dec}) + (r_n, \phi_n, \theta_n) + (0, m * \phi_{step}, 0)$$

where $(r_{res,dec}, \phi_{res,dec}, \theta_{res,dec})$ are decoded residual spherical coordinates, as by a decoder.

The decoded residual spherical coordinates $(r_{res,dec}, \phi_{res,dec}, \theta_{res,dec})$ may be the result of the inverse quantization (IQ) of quantized residual spherical coordinates $Q(r_{res}, \phi_{res}, \theta_{res})$.

In G-PCC, there is no quantization of residual spherical coordinates, and the decoded spherical coordinates $(r_{res,dec}, \phi_{res,dec}, \theta_{res,dec})$ equal the residual spherical coordinates $(r_{res}, \phi_{res}, \theta_{res})$. The decoded spherical coordinates $(r_{dec}, \phi_{dec}, \theta_{dec})$ are then equal to the spherical coordinates $(r, \phi, \theta)$.

Inverse transforming decoded spherical coordinates $(r_{dec}, \phi_{dec}, \theta_{dec})$ may be given by:

$$r = r_{dec} * \Delta r$$
$$x_{pred} = \text{round}(r * \cos(\phi_{dec} * \Delta\phi))$$

-continued $$y_{pred} = \text{round}(r * \sin(\phi_{dec} * \Delta\phi))$$

$$z_{pred} = \text{round}(\tan(\theta_{dec}) * r)$$

where sin( ) and cos( ) are sine and cosine functions. These two functions may be approximated by operations working on fixed-point precision. The values $\tan(\theta_{dec})$ may be also stored as fixed-point precision values. Consequently, no floating-point operation is used in the decoder. Avoiding floating point operations is usually a strong requirement to ease the hardware implementations of codecs.

Residual cartesian coordinates $(x_{res}, y_{res}, z_{res})$ between the original points and predicted cartesian coordinates $(x_{pred}, y_{pred}, z_{pred})$ are given by:

$$(x_{res}, y_{res}, z_{res}) = (x, y, z) - (x_{pred}, y_{pred}, z_{pred})$$

Residual cartesian coordinates $(x_{res}, y_{res}, z_{res})$ are quantized (Q) and quantized residual cartesian coordinates $Q(x_{res}, y_{res}, z_{res})$ are encoded into the bitstream.

Residual cartesian coordinates may be lossless coded when x,y,z quantization steps are equal to the original point precision (typically 1), or lossy coded when quantization steps are larger than the original point precision (typically quantization steps larger than 1).

Decoded cartesian coordinates $(x_{dec}, y_{dec}, z_{dec})$, as by a decoder, are given by:

$$(x_{dec}, y_{dec}, z_{dec}) = (x_{pred}, y_{pred}, z_{pred}) + IQ(Q(x_{res}, y_{res}, z_{res})) \quad (5)$$

where $IQ(Q(x_{res}, y_{res}, z_{res}))$ represents inverse-quantized quantized residual cartesian coordinates.

Those decoded cartesian coordinates $(x_{dec}, y_{dec}, z_{dec})$ may be used by the encoder for example for ordering (decoded) points before attribute coding.

FIG. 6 illustrates a point cloud decoder that is similar to G-PCC predictive tree-based decoder for the predictive tree.

A prediction index n and a number m are accessed from the bitstream B for each node of the predictive tree, while the elementary azimuthal step $\phi_{step}$ or the number of probing per head turn NP is accessed from the bitstream B, for example from a parameter set, and is shared by all nodes of a same predictive tree.

Decoded residual spherical coordinates $(r_{res,dec}, \phi_{res,dec}, \theta_{res,dec})$ may be obtained by decoding residual spherical coordinates $(r_{res}, \phi_{res}, \theta_{res})$ from the bitstream B.

Quantized residual spherical coordinates $Q(r_{res}, \phi_{res}, \theta_{res})$ may be decoded from the bitstream B. The quantized residual spherical coordinates $Q(r_{res}, \phi_{res}, \theta_{res})$ are inverse quantized to obtain decoded residual spherical coordinates $(r_{res,dec}, \phi_{res,dec}, \theta_{res,dec})$.

Decoded spherical coordinates $(r_{dec}, \phi_{dec}, \theta_{dec})$ are obtained by adding decoded residual spherical coordinates $(r_{res,dec}, \phi_{res,dec}, \theta_{res,dec})$ and predicted spherical coordinates $(r_{pred}, \phi_{pred}, \theta_{pred})$ according to equation (4).

Predicted cartesian coordinates $(x_{pred}, y_{pred}, z_{pred})$ are obtained by inverse transforming decoded spherical coordinates $(r_{dec}, dec, \theta_{dec})$ according to equation (3).

Quantized residual cartesian coordinates $Q(x_{res}, y_{res}, z_{res})$ are decoded from the bitstream B and inverse quantized to obtain inverse quantized cartesian coordinates $IQ(Q(x_{res}, y_{res}, z_{res}))$. The decoded cartesian coordinates $(x_{dec}, y_{dec}, z_{dec})$ are given by equation (5).

Points attributes may be coded based on coded cartesian coordinates of points to help in decorrelating the attributes information according to spatial relationship/distances between points.

In G-PCC there are mainly two methods for decorrelating and coding points' attributes: the first one is denoted RAHT for Region Adaptive Hierarchical Transform, and the second one is denoted LoD predictive.

RAHT is using a multi-resolution transform to code the points' attributes. From a low resolution to a full resolution, RAHT successively codes the transformed attributes values in sub bands of a next resolution. The multi resolution decomposition is made from the coded points' coordinates, and each decomposition layer, from the last coded one to the first coded one is obtained by a factor 2 resolution reduction in each dimension, such that each resolution would correspond to the attributes coding for occupancy position of one geometry octree level (for more details, see the G-PCC codec description N0057, January 2021 available on https://www.mpegstandards.org/standards/MPEG-I/9/).

The LoD predictive method can be used to get a kind of multi-resolution representation, but the number of decomposition levels (i.e., the number of levels of details) is parameterizable. Each level of details is obtained using a deterministic method to select a subset of the points, according to their coded coordinates. The LoD predictive method obtains a subsampling of the points between each layer. When using a predicting transform decorrelation method, prediction of an attribute value (a three channels/components color, or a single channel/component reflectance, for instance) of a current decoded point is performed using a weighted prediction from attribute values of the k-nearest neighbors selected among a specified number of the last points in the same layer for which attribute values have been decoded and/or from the points from the parent layers (points belonging to the previously decoded layers). The number 'k' is indicated in the bitstream (in the attributes parameter set) and the weights in the weighted prediction are determined based on a distance between the coordinates (either cartesian or spherical depending on the configuration) of the current point and the coordinates of each one of the nearest neighbors. The nearest neighbors are limited to those that belong to a search window to limit the complexity of the LoD predictive method. More details of the method are given in the G-PCC codec description document N0057, January 2021 (available on https://www.mpegstandards.org/standards/MPEG-I/9/).

The LoD predictive method is also sometimes denoted a lifting transform because it may use the same mechanism as the above predicting transform and adds a lifting step between each decomposition layer in order to have a better energy compaction in the lowest resolutions' representation (i.e., in the first LoD layers) and so a better efficiency in lossy attributes coding.

It has been observed that for point cloud captured by a spinning sensors head, instead of using cartesian coordinates, attributes coding may also benefit from using spherical coordinates $(r, \phi, \theta)$ either directly obtained by predictive tree decoding (i.e., the decoded spherical coordinates) or obtained (i.e. computed) from the decoded cartesian coordinates when octree geometry is used.

Spherical coordinates $(r, \phi, \theta)$ are not always represented with comparable orders of magnitude: the radius r has a magnitude relative to x,y coordinates and a quantization parameter, the azimuthal angle $\phi$ has a magnitude which is relative to an azimuthal angle precision used in the codec, and the magnitude of the elevation angle $\theta$ that is relative to an index of the k-th elevation angle (which may be small value relatively to the two other coordinates). So, to improve attributes coding, the spherical coordinates (r, $\phi$, $\theta$) may be scaled, prior to attributes coding, using scaling factors that are signaled in the bitstream.

In G-PCC, there is one scaling factor coded for each one of the three spherical coordinates $c_k$ ($c_0$=r, $c_1$=$\phi$, and $c_2$=$\theta$). Each scaling factor is coded by a prefix value on five bits and a suffix value. The unsigned integer value of the prefix (0 to 31) plus one (1 to 32) indicates the number of bits of the suffix. The suffix is an unsigned integer value $s_k$ corresponding to a fixed-point representation with 8 bits decimal precision of a scaling factor $\sigma k$, k=0,1,2. Thus, for a scaling factor $\sigma_k$ equal to 1.0, the coded value of $s_k$ is 256 (and the value of the coded prefix is 7); and if the coded $s_k$ is equal to 1 (with a coded prefix equal to 0) the corresponding scaling factor is $\sigma_k$=1.0/256.

In G-PCC, most of the attributes coding configurations are designed to handle positive coordinates. Then, for each point with an index 'i' and with spherical coordinates $c_{k,i}$, before multiplying by the scaling factors, scaling offsets $o_k$ are respectively subtracted from the spherical coordinates $c_k$, k=0,1,2.

Scaled spherical coordinates $sc_{k,i}$, k=0,1,2 are then obtained from spherical coordinates $c_k$, scaling factors $\sigma k$ and scaling offsets $o_k$ by:

$$sc_{k,i} = \text{round}((c_{k,i} - o_k) * \sigma_k) = (c_{k,i} - o_k) * s_k + 128 \gg 8 \qquad (6)$$

for k in {0, 1, 2}.

For a given k (in {0, 1, 2}), the scaling offset $o_k$ equals to the minimum value of the spherical coordinates $c_{k,i}$ over all the coded points (i.e. for any 'i'). Thus, the scaled spherical coordinates $sc_{k,i}$ are greater or equal to zero because the differences ($c_{k,i}$–$o_k$) of equation (6) are always greater or equal to zero and the scaling factor $s_k$ are positive.

Calculating the scaling offset $o_k$ (i.e. obtaining the minimum value) requires accessing to the spherical coordinates of all the coded points, both at the encoder and decoder. It is then required to buffer the spherical coordinates of all the coded points before encoding or decoding their attributes. This behavior introduces delays in the execution pipeline and so increases the latency and the memory footprint.

Removing the requirement for waiting (de) encoding of the coordinates of all the points of the point cloud before starting attributes (de) coding without decreasing the (de) coding efficiency and without increasing the complexity is a problem to be solved.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

The present invention relates to methods and apparatus of encoding/decoding a point cloud into a bitstream of encoded point cloud data captured by a spinning sensors head. Each point of the point cloud is associated with spherical coordinates and attributes. The methods comprises signaling, in the bitstream, a scaling offset information representing scaling offsets, and for each current point of the point cloud: encoding/decoding the spherical coordinates of the current point; obtaining decoded spherical coordinates of the current point from the encoded spherical coordinates; scaling the decoded spherical coordinates of the current point by using the scaling offsets; and encoding/decoding at least one attribute of the current point based on the scaled decoded spherical coordinates.

Signaling in the bitstream such a scaling offset information avoids calculating the scaling offsets at the decoder and then removes the requirement for waiting for a decoding of all the points' coordinates before starting attributes decoding, without impacting the decoding efficiency.

The invention also reduces the memory footprint by removing buffering of all the coordinates of decoded points before decoding attributes of those decoded points.

Figure 7:
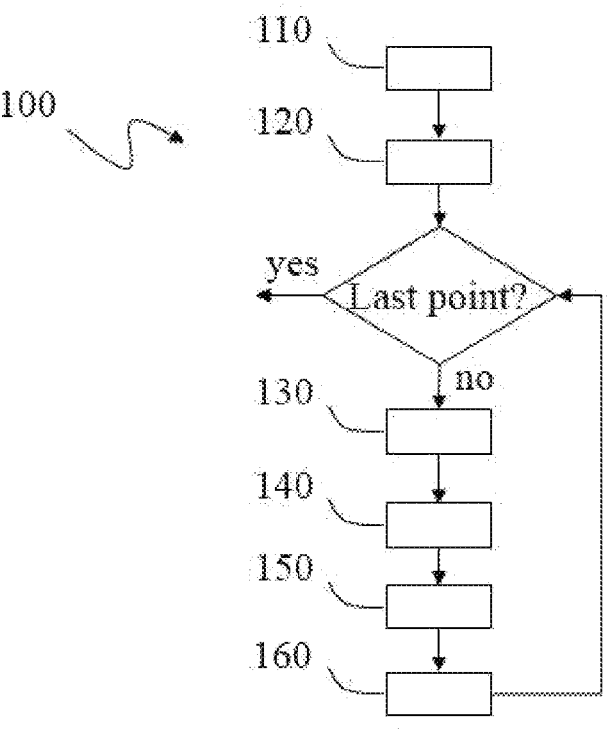
FIG. 7 illustrates a block diagram of steps of a method 100 of encoding attributes of points of a point cloud captured by a spinning sensors head, in accordance with at least one exemplary embodiment.

FIG. 7 illustrates a block diagram of steps of a method 100 of encoding attributes of points of a point cloud captured by a spinning sensors head in accordance with at least one exemplary embodiment.

In step 110, determining scaling offsets $o_k$.

In step 120, a scaling offset information representing the scaling offsets $o_k$ is signaled in the bitstream B.

For each current point of the point cloud, in step 130, the spherical coordinates of the current point are encoded and added to the bitstream B.

In step 140, decoded spherical coordinates are obtained by decoding the encoded spherical coordinates.

In step 150, the decoded spherical coordinates of the current point are scaled based on the scaling offsets $o_k$ by using, for example equation (6).

In step 160, at least one attribute of the current point is encoded based on the scaled decoded spherical coordinates and said at least one encoded attribute is added to the bitstream B.

This method does not require buffering the spherical coordinates of all the points of the point cloud before encoding the points' attributes. This method does not decrease the coding efficiency and does not increase the complexity of the encoding.

The scaling offset information may be any information that can be used to determine the scaling offsets $o_k$ prior to the complete decoding of the spherical coordinates of all the coded points of the point cloud.

The scaling offset information may be provided in a section of the bitstream that can be read/accessed/obtained/decoded before the spherical coordinates of the coded points have been reconstructed/decoded.

In an exemplary embodiment, the scaling offset information is signaled in the attribute parameter set of G-PCC.

In an exemplary embodiment, the scaling offset information is signaled in the geometry parameter set of G-PCC.

In an exemplary embodiment, the scaling offset information is signaled in the attribute brick header of G-PCC.

In an exemplary embodiment, the scaling offset information is signaled in the geometry brick header of G-PCC.

In one exemplary embodiment, the scaling offsets $o_k$ are determined such as to guaranty that the scaled spherical coordinates $sc_{k,i}$ are non-negative and/or belong to specific ranges.

In a first variant, at the encoder, the encoder determines the scaling offsets $o_k$ as the minimum values $m_k$, for any k, calculated from the decoded spherical coordinates $c_{k,i}$ of all the points of the point cloud.

This variant is advantageous because it removes the requirement for waiting for decoding, at decoding side, the spherical coordinates of all the points of the point cloud before starting attributes decoding.

But the encoder would still need to wait and buffer all the points' coordinates before being able to determine the scaling offsets $o_k$ and before being able to start attributes encoding.

In another variant, the encoder determines the scaling offsets $o_k$ as being lower than the minimum values $m_k$, for any k.

In one exemplary embodiment of said later variant, the scaling offsets $o_k$ are determined based on sensor and capture characteristics.

This exemplary embodiment is advantageous because it removes the requirement for waiting for coding/decoding the spherical coordinates of all the points of the point cloud before starting attributes coding/decoding both at the encoding and decoding side.

For example, a sensor and capture characteristic is a binary value indicating if the sensor spinning head did a complete rotation for capturing a frame of the point cloud, and/or a sensor characteristic itself. The geometry coding configuration such as a precision of the points' coordinates, or quantization steps, may be used for determining the scaling offsets $o_k$.

As a first example, a Lidar sensor is mounted on the front of a car and is configured to acquire points in front, corresponding to acquisition in half a sphere, were the azimuthal angles $\phi$ values are comprised in the range $[-2^{N-2}; 2^{N-2}]$ corresponding to an effective azimuthal angle rotation in the range $[-\pi/2; \pi/2]$ (see equation (1)). The encoder can then choose $o_1$ (if k=1 for azimuthal coordinate) to be equal to the lower bound of the azimuthal angle acquisition range: $-2^{N-2}$ for instance, or to be equal to a slightly lower value: the lowest (or a lower than the lowest) value that could be reached by $\phi$, in case of lossy coding for instance.

As a second example, an encoder is configured to not encode any point that would be closer to the sensor than the front, rear, left and right sides of a car on which it is mounted. A minimum radius can the ben be determined by the distance from the sensor to the closest side of the car and used to determine $o_0$ (if k=0 for radius coordinate). This minimum radius is computed based on the physical distance from the sensor to the closest side of the car but also from the encoder configuration information, for instance a quantization step of the radius, and a spatial precision of the point cloud in physical Cartesian space (e.g. a translation of x=1, y=1 and z=1 in the point cloud space would correspond to a translation of 1 mm in x, 1 mm in y and 1 mm in z in the reality/physical space).

As a third example, an encoder is configured to not encode the points coming from the 'n' first elevation angles of the Lidar sensor (they are encoded in another G-PCC slice and the scaling offsets are signaled in a brick header for instance). Then a minimum elevation angle index $o_2$ (if k=2 for elevation angle coordinate) can be determined as being 'n'.

In one exemplary embodiment, the scaling offset information comprises the scaling offsets $o_k$.

In one exemplary embodiment, the scaling offset information also indicates to use a specific method to determine the scaling offsets $o_k$.

In one exemplary embodiment, the scaling offset information comprises a geometry coding configuration information.

In a variant, said a geometry coding configuration information is signaled in the geometry parameter set of G-PCC.

For instance, in G-PCC, since radius r and elevation angle index (or equivalently sensor index) are always positive or equal to zero, the geometry coding configuration information may indicate that the scaling offsets $o_0$ and $o_2$ relative to the radius and the elevation angle are determined as being 0, and that the scaling offset $o_1$, relative to the azimuthal angle, is determined based on the number of bits of precision for azimuthal angle precision that is indicated in the geometry set parameter by the syntax element geom_angular_azimuth_scale_log 2_minus11 (corresponding to N−11 in equation 1). A bound $b_1$ is then given by $2^{geom\_angular\_azimuth\_scale\_log2\_minus11+11-1}$. The azimuthal angle integer representation is then supposed to conform to a constraint indicating that the azimuthal angle integer representation of any point of the point cloud belongs to the range $[-(2^{geom\_angular\_azimuth\_scale\_log2\_minus11+11-1})$, $2^{geom\_angular\_azimuth\_scale\_log2\_minus11+11-1}]=[-b_1;b_1]$, representing a uniform quantization of the $[-\pi, \pi]$ interval. In that case the scaling offset $o_1$ could be set equal to $-b_1$, which would guaranty that the scaled spherical coordinate $sc_{k,1}$ is non negative.

But, in G-PCC's predictive tree, there is nothing that imposes nor guaranties that this constraint is checked by G-PCC compliant bitstreams. A G-PCC encoder can be carefully designed so that it will only produce azimuthal angle integer representations in the range $[-b_1;b_1]$, but from a decoding point of view, there is no guaranty that the encoder took care of this constraint while generating G-PCC compliant bitstreams.

To tackle this problem, in a variant, the geometry coding configuration information indicates the decoded azimuthal angles $c_{1,i}$ belong to the range $[-b_1,b_1]$ and the scaling offset $o_1$ is determined as being $o_1=-b_1$ so that the scaled decoded azimuthal angles $sc_{1,i}$ are non-negative.

This variant is advantageous because it does not require any amendment of the decoding of the points' coordinates.

But, just imposing to generate a bitstream checking that constraint is not especially the best solution, as there could be some mistakes in an encoder leading to non-compliant bitstreams.

In a variant, the geometry decoding is amended to obtain non-negative scaled decoded azimuthal angles $sc_{1,i}$, even if the difference $(c_{k,i}-o_k)$ is negative.

In a variant, the decoded azimuthal angles $c_{1,i}$ are clipped to check the decoded azimuthal angles belong to the range $[-b_1;b_1]$, if a decoded azimuthal angle $c_{1,i}$ is lower than $-b_1$, then the decoded azimuthal angle $c_{1,i}$ is set equal to $-b_1$ or if a decoded azimuthal angle $c_{1,i}$ is higher than $b_1$ then the decoded azimuthal angle $c_{1,i}$ is set equal to $b_1$ prior to computing the scaled azimuthal angle.

In another variant if a decoded azimuthal angle $c_{1,i}$ is higher than $b_1$ the decoded azimuthal angle value is not modified/clipped, because it does not prevent from decoding attributes.

Using equation (6) with this variant clipping the lower bound of the decoded azimuthal angles $c_{1,i}$ to check ensure the non-negativity of the scaled decoded azimuthal angle $sc_{1,i}$, is equivalent to use equation (7):

$$sc_{k,i} = \max(0, (c_{k,i} - o_k)) * s_k + 128 \gg 8, \qquad (7)$$

to clip negative scaled decoded azimuthal angles $Sc_{1,i}$ to zero, with the scaling offset $o_1$ being determined as being $o_1=-b_1$.

In a variant, the encoder uses a modulo operation (or equivalent) on the decoded azimuthal angles $c_{1,i}$ to constrain the decoded azimuthal angles $c_{1,i}$ to belong to the range $[-b_1,b_1]$ (or equivalently to the range $[-\pi, \pi]$): if a decoded azimuthal angle $c_{1,i}$ is outside $[-b_1,b_1]$, the decoded azimuthal angle is set equal to $c_{1,i}$ modulo $b_1$. For instance, while a decoded azimuthal angle $c_{1,i}$ is lower than $-b_1$ then the decoded azimuthal angle is set equal to $c_{1,i}+ (1+2*b_1)$ and while $c_{1,i}$ is higher than $b_1$, $c_{1,i}$ is set equal to $c_{1,i}$ $-(1+2*b_1)$. This iterative process would often be preferred as it is less costly in terms of CPU runtime than using a "true" modulo operation.

The modulo operation may behave differently on negative numbers depending on its definition and/or the programing language that is used. Referring to the definition given by Donald Knuth:

$$\mathrm{mod}(a, n) = a - n * \mathrm{floor}(a/n), \qquad (8)$$

the above description of using modulo operation with $b_1$ is roughly equivalent to letting $c_{1,i}$ be equal to $$\mathrm{mod}(c_{1,i} + b_1, 2 * b_1) - b_1. \qquad (9)$$

The only difference is that when using equation (9) $c_{1,i}$ is strictly lower than $b_1$.

Using equation (6) and using the modulo operation is then also equivalent to first calculating the difference $d_{1,i}=$ $(c_{1,i}-o_1)$, with the scaling offset $o_1$ being determined as being $o_1=-b_1$, and second applying the modulo operation to $d_{1,i}$ and so, for scaled decoded azimuthal angle $sc_{1,i}$, replacing equation (6) by:

$$sc_{1,i} = \mathrm{mod}(c_{1,i} - o_k, 2 * b_1) * s_1 + 128 \gg 8. \qquad (10)$$

The clipping or modulo operation can be done during the geometry decoding process so that prediction of following decoded points takes into account the modified azimuthal angles.

Alternatively, the clipping or modulo operation may be performed after the geometry decoding, before attributes decoding, for instance as illustrated above, during the scaling of the coordinates.

In a variant, scaling offsets that could be tuned by the encoder (this can be done without buffering the points if needed, for instance on a preceding frame) are signaled in the attribute parameter set, but do not guaranty that $(c_{k,i}-o_k)$ is always greater or equal to zero. Then, instead of using equation (6), the scaled coefficients are determined using a method which guaranties that the scaled coefficients $sc_{k,i}$ will be higher or equal to zero, for instance using equation (7) or using the modulo operation, for instance using equation (10).

Figure 8:
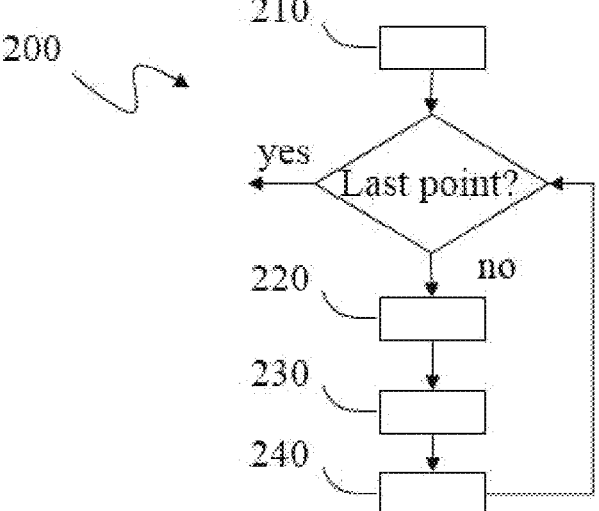
FIG. 8 illustrates a block diagram of steps of a method 200 of decoding points' attributes of a point cloud captured by a spinning sensors head, in accordance with at least one exemplary embodiment.

FIG. 8 illustrates a block diagram of steps of a method 200 of decoding points' attributes of a point cloud captured by a spinning sensors head, in accordance with at least one exemplary embodiment.

In step 210, a scaling offset information is accessed from the bitstream B.

For each current point of the point cloud, in step 220, decoded spherical coordinates are obtained based on encoded spherical coordinates of the current point obtained from the bitstream B, the spherical coordinates of the current point representing an azimuthal angle representing a capture angle of a sensor of the spinning sensors head that captured the current point, an elevation angle relative to an elevation of the sensor that captured the current point and a radius depending on a distance of the current point from a referential.

In step 230, the decoded spherical coordinates are scaled based on scaling offsets $o_k$ obtained from the scaling offset information, by using, for example equation (6).

In step 240, attribute(s) of the points of the points cloud is (are) decoded based on the scaled decoded spherical coordinates.

A G-PCC compliant bitstream shall comprise multiple configuration information used for decoding encoded point cloud data.

Some existing syntax elements of the G-PCC compliant bitstream B shall have particular values to implement the present invention and some new syntax elements are required.

Thus, in one exemplary embodiment, the scaling offset information comprises a geometry coding and an attribute coding configuration information indicating to use a specific method to determine the scaling offsets $o_k$.

For example, regarding existing syntax elements forming the said geometry coding and the said attribute coding configuration information, in a geometry parameter set the existing syntax element "geom_tree_type" is set to 1 to indicate that the predictive tree is used for geometry coding. The existing syntax element "geometry_angular_enabled_ flag" is set to 1 in the geometry parameter set to indicate the predictive tree is using spherical coordinates in the prediction scheme. In the attribute parameter set, the existing syntax element "attr_coding_type/attr_encoding" is set to 0 to indicate that a LoD predicting transform is used for points' attributes the encoding, existing syntax element "lod_scalability_enabled_flag/scalable_lifting_enabled_ flag" is set to 0 to indicate that scalable representation is not used, the existing syntax element "max_num_detail_levels_ minus1/num_detail_levels_minus1" is set to 0 to indicate that a single layer of details is used, and the existing syntax element "morton_sort_skip_enabled_flag/canonical_poin- t_order_flag" is set to 1 to indicate that the points' attributes are encoded in the same order as they are coded for geometry. The existing syntax element "aps_coord_conv- _flag/spherical_coord_flag" is set to 1 to indicate that points' attributes are encoded using spherical coordinates, which give better compression performances of points' attributes, and to indicate that scaling factors are signaled in the bitstream.

According to the invention, a new syntax element is added in the bitstream to signal the scaling offset information.

Signaling the scaling offset information indicates that a particular extension mechanism is used for point's attributes encoding and that attributes coding parameters are signaled in the bitstream, for example, in an extension part of the attribute parameter set of G-PCC compliant bitstream.

In one exemplary embodiment, the new syntax element signaling the scaling offset information comprises a binary information, e.g. a flag denoted "attr_coord_conv_sca- le_fixed_offset_flag" and the scaling offsets. The binary information is set to 1 to indicate that the scaling offsets $o_k$ are then effectively signaled in the bitstream, and the binary information is followed in the bitstream by information representative of the scaling offsets.

The decoding method 200 decodes the binary information (e.g. flag "attr_coord_conv_scale_fixed_offset_flag") from the bitstream. If the binary information is equal to 1, the scaling offsets $o_k$ are then obtained by decoding the information representative of said scaling offsets $o_k$ from the bitstream. If the binary information is equal to 0 the decoding method 200 is not enabled.

In one exemplary embodiment, the new syntax element signaling the scaling offset information comprises a binary information, e.g. a flag denoted "attr_coord_conv_scale_fixed_offset_flag", which is set to 1 to indicate that the scaling offsets $(o_1, o_1, o_2)$ are respectively equal to $(0,-(2^{geom\_angular\_azimuth\_scale\_log2\_minus11+11-1}),0)$. The binary information is set to 1 to also indicate that equation (7) is used for scaling the spherical coordinates of the decoded points instead of equation (6).

The decoding method 200 decodes the binary information (e.g. "attr_coord_conv_scale_fixed_offset_flag") from the bitstream. If the binary information is equal to 1, the scaling offsets $(o_0, o_1, o_2)$ are set respectively to $(0,-(2^{geom\_angular\_azimuth\_scale\_log2\_minus11+11-1}),0)$ and the equation (7) is used for scaling the spherical coordinates of the decoded point, instead of equation (6). If the binary information is equal to zero the decoding method 200 is not enabled.

In one variant, the attribute coding configuration information (and optionally the geometry coding configuration information) indicates that the attributes coding/decoding method can support using negative geometry coordinates (and so negative values of scaled decoded spherical coordinates). For instance, using the example above for the signaling of the existing syntax elements, in one exemplary embodiment, the new syntax element signaling the scaling offset information comprises a binary information, e.g. a flag denoted "attr_coord_conv_scale_fixed_offset_flag", which is set to 1 to indicate that the scaling offsets $(o_1, o_1, o_2)$ are respectively equal to $(0,0,0)$.

Figure 9:
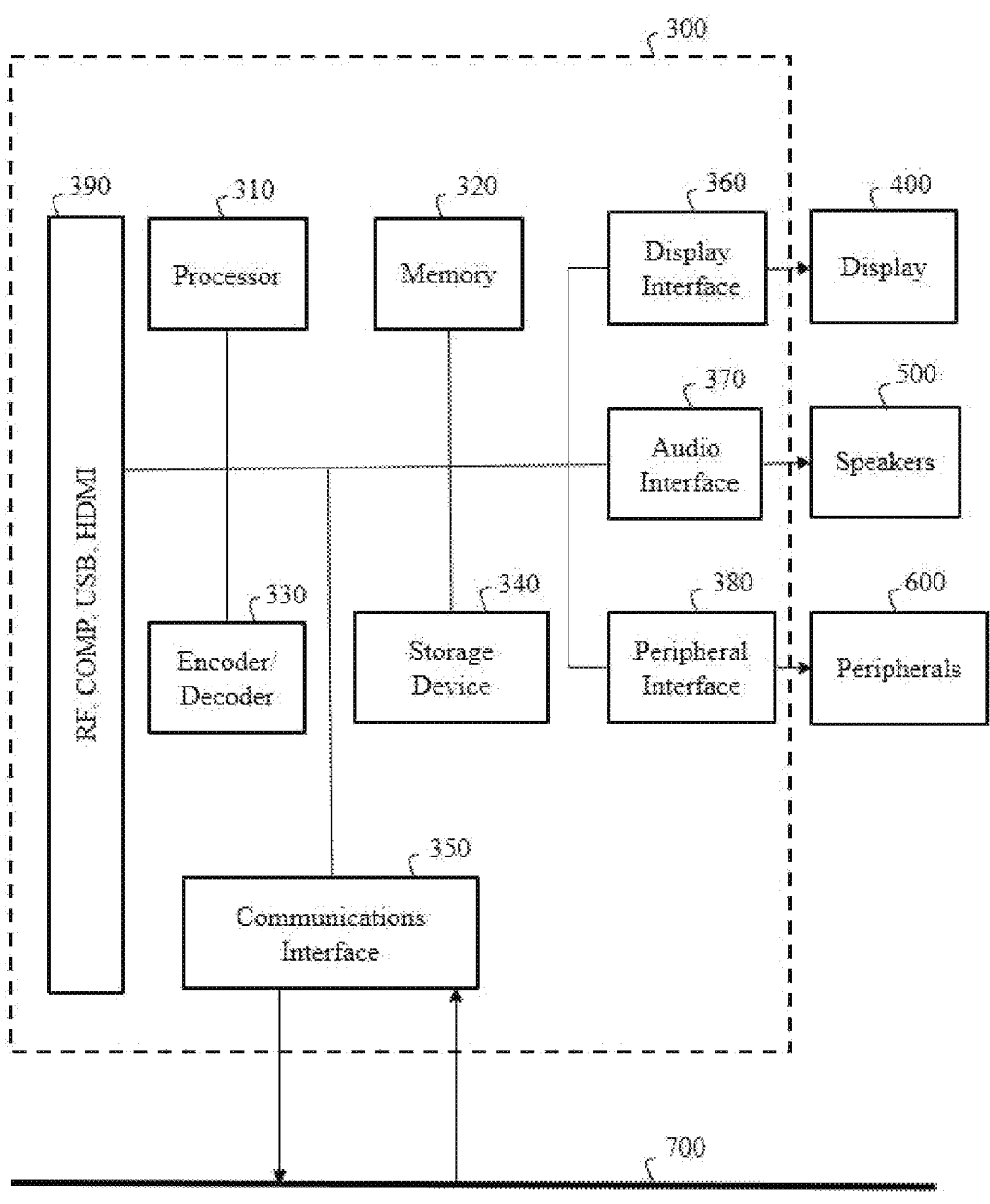
FIG. 9 illustrates a schematic block diagram of an example of a system in which various aspects and exemplary embodiments are implemented.

FIG. 9 shows a schematic block diagram illustrating an example of a system in which various aspects and exemplary embodiments are implemented.

System 300 may be embedded as one or more devices including the various components described below. In various embodiments, the system 300 may be configured to implement one or more of the aspects described in the present application.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present application. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both of the encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the present application may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise the bitstream B and/or information such a scaled offset information.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input 390 is part of a separate set-top box. In various embodiments in which the display 400 and speakers 500 may be external components, the output signal may be provided via dedicated output connections, including, for example, HDMI ports, USB ports, or COMP outputs.

In FIG. 1-9, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example.

As further examples, in one embodiment "decoding" may refer to entropy decoding, in another embodiment "decoding" may refer only to differential decoding, and in another embodiment "decoding" may refer to combinations of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to entropy encoding, in another embodiment "encoding" may refer only to differential encoding, and in another embodiment "encoding" may refer to combinations of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory or bitstream), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory or bitstream). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a scaled offset information. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding, comprising:
   receiving sparse geometry data captured by a spinning sensors head;
   encoding a point cloud into a bitstream of encoded point cloud data, the point cloud based on the sparse geometry data and each point of the point cloud being associated with spherical coordinates and at least one attribute, said spherical coordinates representing an azimuthal angle representing a capture angle of the sensor of the spinning sensors head that captured the point, an elevation angle relative to an elevation of the sensor that captured the point and a radius depending on a distance of the point from a referential, the encoding comprising:
      signaling (120), in the bitstream, a scaling offset information representing scaling offsets;
   for each current point of the point cloud:
      encoding (130) the spherical coordinates of the current point and adding encoded spherical coordinates of the current point to the bitstream;
      obtaining (140) decoded spherical coordinates by decoding the encoded spherical coordinates of the current point;
      scaling (150) the decoded spherical coordinates based on the scaling offsets; and
      encoding (160) at least one attribute of the current point based on the scaled decoded spherical coordinates and adding at least one encoded attribute to the bitstream, the attribute being one of color or reflectance of the current point; and
      transmitting the bitstream of encoded point cloud data.

2. The method of claim 1, wherein the scaling offsets are determined to guaranty that the scaled spherical coordinates meet at least one of the following:
   being non-negative; or
   belonging to specific ranges.

3. The method of claim 2, wherein the scaling offsets are determined as being lower than minimum values calculated from decoded spherical coordinates of all the points of the point cloud.

4. The method of claim 2, wherein the scaling offsets are determined based on sensor and capture characteristics of the sensor spinning head.

5. The method of claim 1, wherein the scaling offset information comprises the scaling offsets.

6. The method of claim 1, wherein the scaling offset information indicates to use a specific method to determine the scaling offsets.

7. The method of claim 6, wherein a specific method uses a clipping or a modulo operation.

8. An apparatus of encoding, comprising:
   one or more processors that, in
   response to executing non-transitory instructions, cause the apparatus to:
      receive sparse geometry data captured by a spinning sensor head;
      encode a point cloud into a bitstream of encoded point cloud data, the point cloud based on the sparse geometry data and each point of the point cloud being associated with spherical coordinates and at least one attribute, said spherical coordinates representing an azimuthal angle representing a capture angle of the sensor of the spinning sensors head that captured the point, an elevation angle relative to an elevation of the sensor that captured the point and a radius depending on a distance of the point from a referential, the encode including:
         signal, in the bitstream, a scaling offset information representing scaling offsets;
         for each current point of the point cloud:
            encode the spherical coordinates of the current point and adding encoded spherical coordinates to the bitstream;
            obtain decoded spherical coordinates of the current point by decoding the encoded spherical coordinates;
            scale the decoded spherical coordinates of the current point based on the scaling offsets; and
            encode at least one attribute of the current point based on the scaled decoded spherical coordinates and adding at least one encoded attribute to the bitstream, the attribute being one of color or reflectance of the current point; and
      transmit the bitstream of encoded point cloud data.

9. A non-transitory storage medium carrying instructions of program code for executing the method according to claim 1.

10. A method of decoding a point cloud from a bitstream of encoded point cloud data captured by a spinning sensors head, wherein the method comprises:
   receiving the bitstream of encoded point cloud data;
      accessing (210) a scaling offset information from the bitstream;

for each current point of the point cloud:

obtaining (220) decoded spherical coordinates by decoding encoded spherical coordinates of the current point obtained from the bitstream, the spherical coordinates of the current point representing an azimuthal angle representing a capture angle of the sensor of a spinning sensors head that captured the current point, an elevation angle relative to an elevation of the sensor that captured the current point and a radius depending on a distance of the current point from a referential;

scaling (230) the decoded spherical coordinates based on scaling offsets obtained from the scaling offset information; and decoding (240) attributes of the current point based on the scaled decoded spherical coordinates, the attributes including one of color or reflectance of the current point.

11. A non-transitory storage medium carrying instructions of program code for executing the method according to claim 10.

12. The method of claim 10, wherein the scaling offsets are determined to guaranty that the scaled spherical coordinates are met at least one of the following:

being non-negative; or belonging to specific ranges.

13. The method of claim 12, wherein the scaling offsets are determined as being lower than minimum values calculated from decoded spherical coordinates of all the points of the point cloud.

14. The method of claim 12, wherein the scaling offsets are determined based on sensor and capture characteristics of the sensor spinning head.

15. The method of claim 10, wherein the scaling offset information comprises the scaling offsets.

16. The method of claim 10, wherein the scaling offset information indicates to use a specific method to determine the scaling offsets.

17. The method of claim 16, wherein a specific method uses a clipping or a modulo operation.

18. An apparatus of decoding a point cloud from a bitstream of encoded point cloud data captured by a spinning sensors head, wherein the apparatus comprises one or more processors configured to perform the method according to claim 10.

19. The apparatus of claim 8, wherein the scaling offsets are determined to guaranty that the scaled spherical coordinates are met at least one of the following:

being non-negative; or belonging to specific ranges.

20. The apparatus of claim 18, wherein the scaling offsets are determined to guaranty that the scaled spherical coordinates are met at least one of the following:

being non-negative; or belonging to specific ranges.

* * * * *